Aug. 13, 1946.  W. R. SPOHN  2,405,766
THEATRICAL APPARATUS
Filed Nov. 2, 1942  3 Sheets-Sheet 1

INVENTOR
Walter R. Spohn
By Archworth Martin
His Attorney

Aug. 13, 1946.  W. R. SPOHN  2,405,766
THEATRICAL APPARATUS
Filed Nov. 2, 1942   3 Sheets-Sheet 2

INVENTOR
Walter R. Spohn
By Archworth Martin
His Attorney

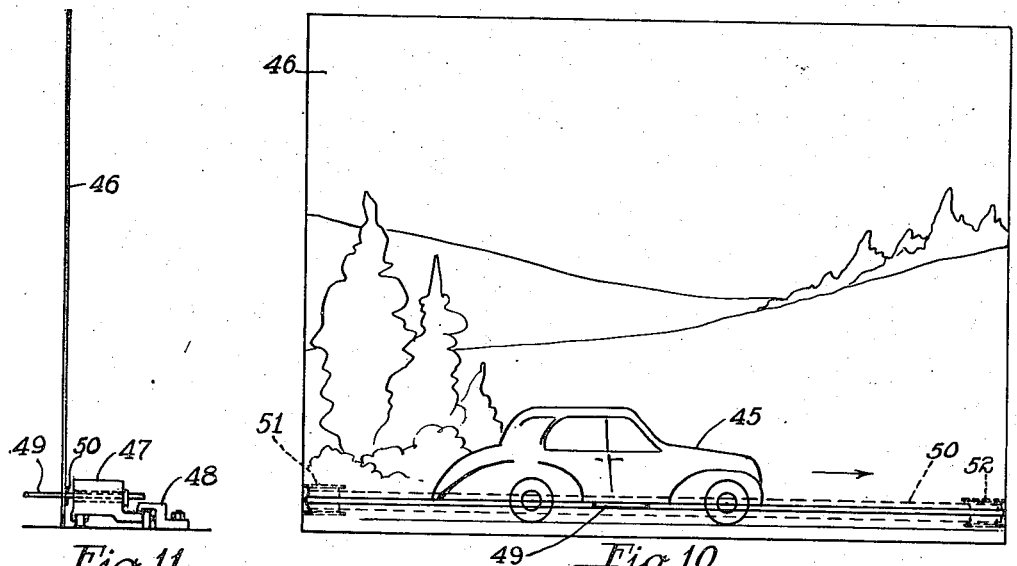
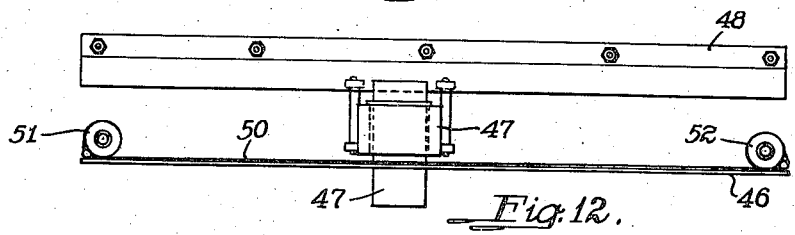

Patented Aug. 13, 1946

2,405,766

UNITED STATES PATENT OFFICE 2,405,766

THEATRICAL APPARATUS

Walter R. Spohn, Pittsburgh, Pa.

Application November 2, 1942, Serial No. 464,312

5 Claims. (Cl. 272—9)

My invention relates to the motion picture, theatrical and magic arts, and particularly to means involving the employment of certain novel and unconventional steps in the practice of said arts, either singly or in combination.

One object of my invention is to produce a series of intimate blendings of these arts, for the purpose of creating various instructive or entertaining illusions, including instruction in the theatrical arts or purely for theatrical presentation.

A further object of my invention is to provide apparatus and a method whereby a motion picture exhibition may also include as a component part thereof actors in the flesh as well as the physical presence of other objects in motion.

In the practice of my invention, a motion picture screen can be especially prepared as hereinafter described, utilizing the art of magic where animate and inanimate objects are made interchangeable and wherein some cases windows, ladders, steps, automobiles etc. are intimately combined or intermingled, as between pictured representations and actual objects.

Figure 2:
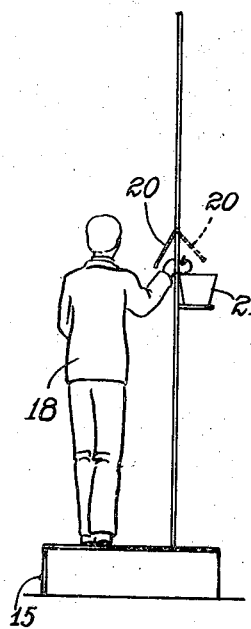
Figure 1:
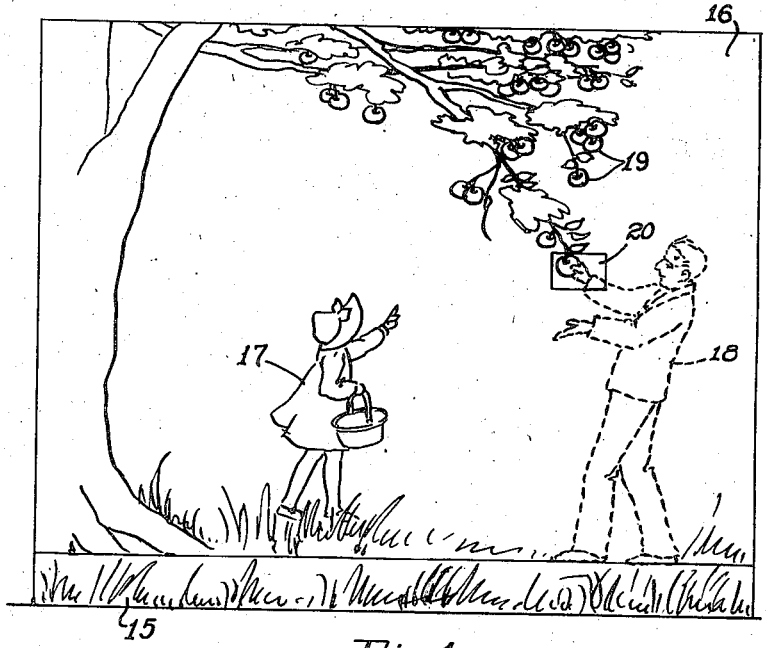
Figures 3, 4:
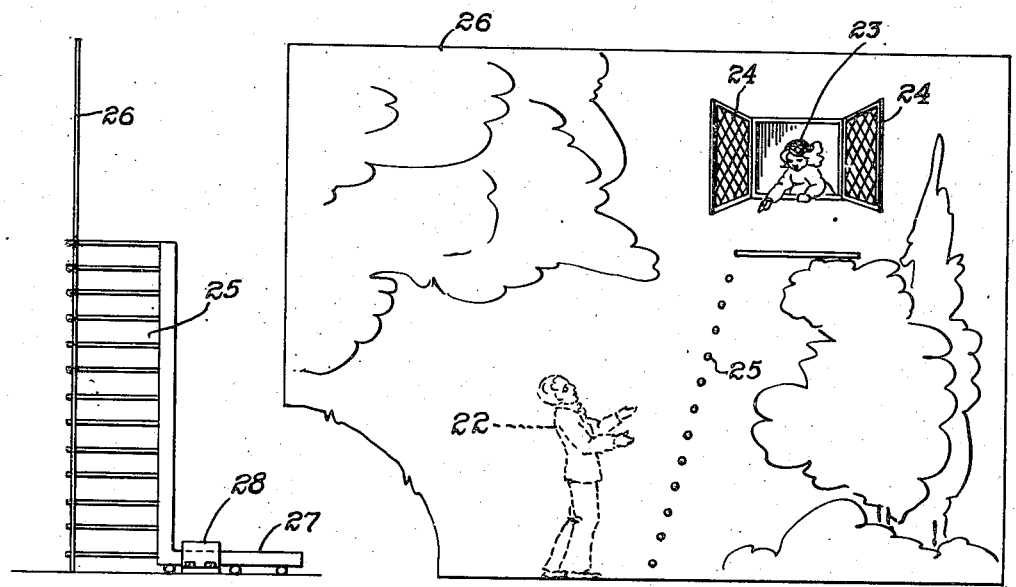
Figure 5:
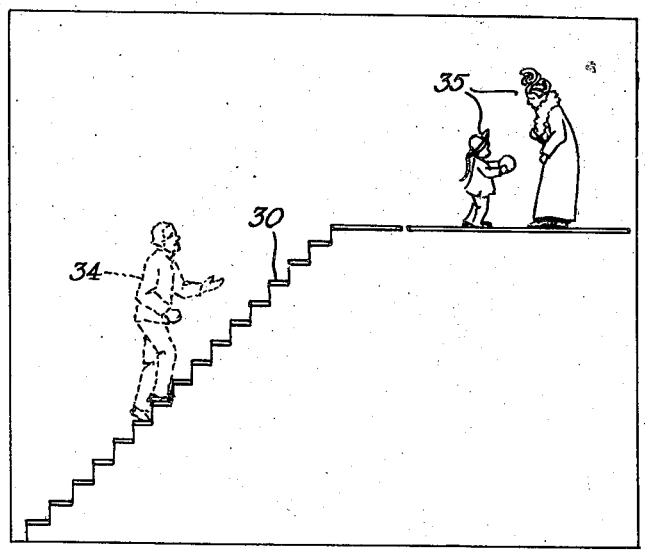
Figure 6:
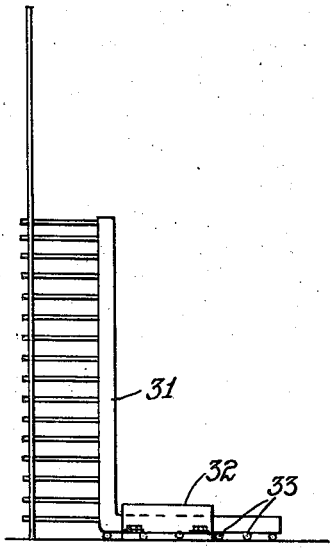
Figure 7:
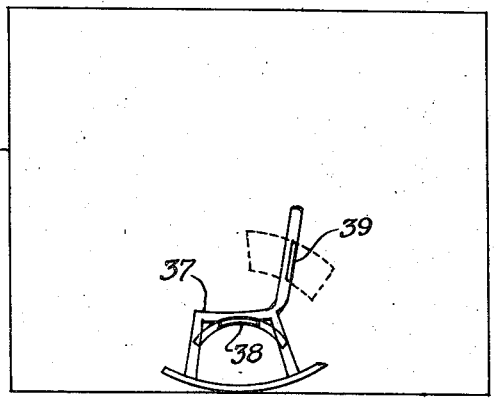
Figure 8:
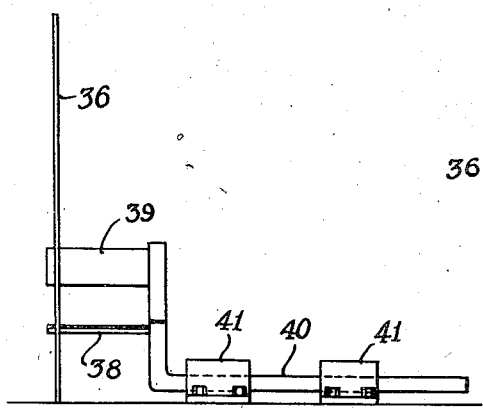
Figure 9:
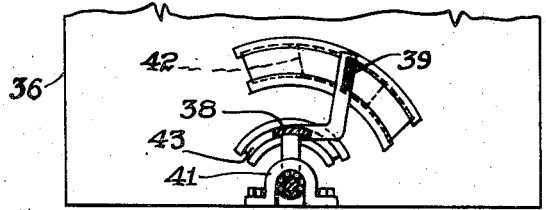

In the accompanying drawings, Fig. 1 is a face view of a motion picture screen indicating one manner in which the invention of my method may be practiced; Fig. 2 is an edge view thereof; Figs. 3 and 4 are face and edge views respectively of a motion picture screen and certain apparatus employed in connection therewith; Figs. 5 and 6 are face and edge views respectively of a motion picture screen showing another form of apparatus employed therewith; Figs. 7 and 8 show still another modification of the apparatus of Figs. 3 to 6; Fig. 9 is a view, on an enlarged scale, looking toward the rear side of the screen of Fig. 7; Fig. 10 is a face view of a screen, with another form of movable apparatus associated therewith, and Figs. 11 and 12 are plan and edge views thereof, respectively.

In Figs. 1 and 2, I show a projection screen 16 containing a character 17 projected thereon from a partially complete film. The character 18 represents a flesh and blood actor who walks on the stage, or a platform 15 whose front face corresponds to the screen face, to receive a portion of the projected scene. During the reproduction of the voice of the character 17, he will conduct the missing part of a dialogue. Fruit 19 is represented in the photographed showing and a portion of the screen is cut out to provide a small door 20 that usually hangs in vertical position, flush with the face of the screen. During the projection of the picture, the actor 18 may reach toward the tree, pushing the door 20 to its dotted line position, and lifting an apple from a receptacle 21 to simulate the pulling thereof from the tree. If desired, the apple can be pushed through the screen by another person at the rear thereof, the door 20 in that case being pushed forwardly to its full line position in Fig. 2. It will be understood that other objects (animate or inanimate) can similarly be passed or pulled through the screen by a live actor at the front side thereof.

In Figs. 3 and 4, I show still another arrangement, wherein a live actor 22 walks on a stage and speaks with a pictured actor 23 whose voice and actions have previously been recorded and photographed. The live actor will walk up a ladder 25 to approach the pictured actor 24. The actor 23 and window 24 can be merely a part of a photographed scene or in actual physical being on the screen; that is, 23 can be an actual person looking through the screen 26 and 24 may be screen flap members that swing to open and close. The ladder has its rungs extending through the screen 26, the outer ends of the rungs being coated with the same material as the screen so as not to be readily visible, particularly when the ladder is in its rearwardly retracted position, flush with the screen. The ladder is mounted upon a truck 27 movable forwardly and rearwardly through a guideway 28 that prevents it from tilting when the actor mounts the ladder rungs. When the actor 23 walks on the stage and the ladder is in its forwardly-projecting position with its rungs 25 extending out through the screen, he may mount the ladder.

Similarly, in Figs. 5 and 6, I show a stairway 30 that may lead to a pictured landing, stage or the like, on and about which some pictured action is occurring. The stair treads are mounted on a supporting frame 31 located at the rear of the screen, the frame being movable forwardly and backwardly through a guide 32 on suitable rollers 33. When the stairway is projected outwardly, a living actor 34 who has walked to the front of the screen may mount them while supplying conversation complemental to the dialogue of the pictured actors 35.

In Figs. 7, 8 and 9, I show a screen 36, on which is pictured a rocking chair 37 in motion. Photographs of desired actors and photographs of the unoccupied chair will also be projected on the screen. A seat element 38 and a back rest 39 for a live actor are carried on a support 40 that is supported for rocking movement in guideways 41 and is shiftable therein to project the seat and back rest members 38 and 39 through the screen a sufficient distance for an actor to use them for support. Arcuate openings are required in the screen for oscillatory movement for the members 38 and 39, and these openings are covered at their rear sides of the screen by shields 42 and 43 which are slidably supported in suitable guideways and through which the bars 38 and 39 extend, so that the shields will be oscillated along with the members 38 and 39, and thereby cover the openings in the screen. An actor sitting on the member 38 and leaning against 39 will synchronize his rocking movements with the pictured rocking motion of the chair 37.

Referring now to Figs. 10 and 12, I show the projected picture of a traveling automobile 45 on a screen 46. While the automobile is pictured as moving along on the screen, a person in the flesh will be carried along the front of the screen in a manner to suggest that he is riding on the footboard of the automobile. A truck 47 supplied with suitable motive power is given traveling movement behind the screen in synchronism with the pictured movement of the automobile. A guide rail 48 prevents tipping of the truck 47 by the weight of the person on a footboard 49 that is carried by the truck and projects through a slot in the screen 46. The board is slidable forwardly and rearwardly on the truck.

The slit in the screen is covered by a ribbon 50 through which the board projects, and it will be pulled along by the board. The ribbon is wound at its ends on spring-tensioned reels 51 and 52, so that when it is drawn from one reel through traveling of the board 49, it will automatically be wound on the other reel and will therefore be maintained under tension and caused to lie flat against the rear side of the screen to conceal the slit and to receive that portion of the projected picture that would otherwise be lost at the slit.

The term "objects" is employed in the claims as broad enough to include either persons, or animals etc., as well as inanimate objects.

I claim as my invention:

1. Theatrical apparatus comprising a motion picture screen, parts of whose projection-receiving area are mobile, a mobile object movable at the front of the screen, and means operable from the rear of the screen and movable with the mobile part thereof, for operating the said object.

2. Theatrical apparatus comprising a motion picture screen, a part of whose projection-receiving area is movable in a direction parallel to the plane of the screen, a mobile object movable at the front of the screen, and means extending through an opening in the screen and operable from the rear side thereof, to move the said part of the screen and said object in planes parallel to the screen, the said part of the screen serving to conceal the said opening.

3. Theatrical apparatus comprising a motion picture screen, a part of whose projection-receiving area is movable in a direction parallel to the plane of the screen, a mobile object movable at the front of the screen, and means extending through a slot in the screen, and movable longitudinally thereof, to shift the said part of the screen and said object in a direction parallel to the slot, the said screen part being of sufficient length and width to completely cover the slot during said movement.

4. Theatrical apparatus comprising a motion picture screen having an opening therethrough, means concealing said opening and constituting a part of the projection-receiving area, and means operable from the rear of the screen for moving said concealing means and an object associated therewith which is visible at the front of the screen.

5. Theatrical apparatus comprising a motion picture screen having an opening therethrough, means concealing said opening and constituting a part of the projection-receiving area, and means operable from the rear of the screen for moving said concealing means and an object associated therewith which is visible at the front of the screen, the said object being projectable forwardly through the opening.

WALTER R. SPOHN.